(12) United States Patent
Fritz et al.

(10) Patent No.: US 10,787,177 B2
(45) Date of Patent: *Sep. 29, 2020

(54) EXTERIOR REARVIEW DEVICE WITH ILLUMINATION FUNCTIONS AND AUTONOMOUS VEHICLES USING SAME

(71) Applicant: SMR Patents S.à.r.l., Luxembourg (LU)

(72) Inventors: Daniel Fritz, Stuttgart (DE); Ilka Rötzer, Stuttgart (DE); Eugen Meier, Stuttgart (DE); Oliver Schmidt, Stuttgart (DE); Romeo Wieczorek, Stuttgart (DE); Andrea König, Stuttgart (DE); Peter Hein, Stuttgart (DE); Alexandru Dobrete, Stuttgart (DE); Andreas Herrmann, Stuttgart (DE); Adam Di Fiore, Stuttgart (DE); Phillip McKenzie, Stuttgart (DE); Marco Cid, Stuttgart (DE); Simon Belcher, Stuttgart (DE); Reinhold Langbein, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,170

(22) Filed: Nov. 19, 2018

(65) Prior Publication Data
US 2019/0084585 A1    Mar. 21, 2019

Related U.S. Application Data

(63) Continuation-in-part of application No. 15/865,964, filed on Jan. 9, 2018, and a continuation-in-part of (Continued)

(30) Foreign Application Priority Data

Jun. 29, 2011   (DE) .................. 10 2011 105 983

(51) Int. Cl.
*B60W 50/14*   (2020.01)
*B60K 35/00*   (2006.01)
(Continued)

(52) U.S. Cl.
CPC ............. *B60W 50/14* (2013.01); *B60K 35/00* (2013.01); *B60Q 1/0017* (2013.01); *B60Q 1/24* (2013.01);
(Continued)

(58) Field of Classification Search
CPC ..... B60R 16/027; G06K 9/00845; B60Q 1/00
(Continued)

(56) References Cited

U.S. PATENT DOCUMENTS

| | | |
|---|---|---|
| 2,561,582 A | 7/1951 | Marbel |
| 2,595,331 A | 5/1952 | Calihan et al. |

(Continued)

FOREIGN PATENT DOCUMENTS

| | | |
|---|---|---|
| CN | 101780787 A | 7/2010 |
| DE | 19637459 A1 | 3/1997 |

(Continued)

OTHER PUBLICATIONS

International Search Report and Written Opinion dated Jan. 16, 2014 of International application No. PCT/EP2012/062360.

*Primary Examiner* — Tan Q Nguyen
(74) *Attorney, Agent, or Firm* — Jones Day

(57) ABSTRACT

An exterior rearview system for an autonomous vehicle includes a housing adapted for mounting to an exterior side of a vehicle, the housing holding at least one of a reflective element or display screen for displaying to a driver a rear or side image of the vehicle, one or more lighting modules disposed in the housing and providing an adaptive lighting sector which is adaptively controlled, and a control system configured to receive input data related to at least one of a (Continued)

user's intention using a tracking sensor and a user's retaking control of the autonomous vehicle.

23 Claims, 11 Drawing Sheets

Related U.S. Application Data application No. 15/391,026, filed on Dec. 27, 2016, now Pat. No. 10,137,823, which is a continuation-in-part of application No. 14/129,559, filed as application No. PCT/EP2012/062360 on Jun. 26, 2012, now Pat. No. 9,527,431.

(51) Int. Cl.

| | | |
|---|---|---|
| B60Q 1/34 | (2006.01) | |
| B60Q 1/26 | (2006.01) | |
| B60Q 1/24 | (2006.01) | |
| B60Q 1/00 | (2006.01) | |
| B60R 1/00 | (2006.01) | |
| G05D 1/00 | (2006.01) | |
| B60Q 1/32 | (2006.01) | |
| B60Q 9/00 | (2006.01) | |
| B60R 1/06 | (2006.01) | |
| B60R 1/12 | (2006.01) | |

(52) U.S. Cl.
CPC .......... *B60Q 1/2696* (2013.01); *B60Q 1/32* (2013.01); *B60Q 1/346* (2013.01); *B60Q 9/00* (2013.01); *B60R 1/00* (2013.01); *G05D 1/0061* (2013.01); *B60Q 2400/30* (2013.01); *B60R 1/06* (2013.01); *B60R 1/1207* (2013.01); *B60R 2300/70* (2013.01)

(58) Field of Classification Search
USPC .......................................................... 701/23
See application file for complete search history.

(56) References Cited

U.S. PATENT DOCUMENTS

| 4,733,333 | A | 3/1988 | Shibata et al. |
|---|---|---|---|
| 5,428,512 | A | 6/1995 | Mouzas |
| 5,499,169 | A | 3/1996 | Chen |
| 6,049,271 | A | 4/2000 | Chu |
| 6,106,140 | A | 8/2000 | Krummer et al. |
| 6,250,784 | B1 | 6/2001 | Kayama |
| 6,561,685 | B2 | 5/2003 | Weber et al. |
| 6,769,798 | B2 | 8/2004 | Mishimagi |
| 7,175,321 | B1 | 2/2007 | Lopez |
| 7,248,151 | B2 | 7/2007 | McCall |
| 7,255,464 | B2 | 8/2007 | Rodriguez Barros et al. |
| 7,287,884 | B2 | 10/2007 | Koike |
| 7,360,934 | B2 | 4/2008 | Sakurada |
| 7,372,611 | B2 * | 5/2008 | Tonar ................ B60R 1/08 359/265 |
| 8,080,941 | B2 | 12/2011 | Takata |
| 8,080,942 | B2 | 12/2011 | Heider et al. |
| 8,164,923 | B2 | 4/2012 | Bonnet et al. |
| 8,382,351 | B2 | 2/2013 | Ishikawa et al. |
| 8,466,780 | B2 * | 6/2013 | Lynam ............... B60Q 1/2665 340/435 |
| 8,531,285 | B2 | 9/2013 | Purks et al. |
| 8,764,256 | B2 | 7/2014 | Foote et al. |
| 9,283,819 | B2 | 3/2016 | Salter et al. |
| 9,321,395 | B2 | 4/2016 | Ammar et al. |
| 9,760,698 | B2 | 9/2017 | Pisz |
| 2002/0089418 | A1 | 7/2002 | Shy |
| 2004/0151004 | A1 | 8/2004 | Shih |
| 2005/0117364 | A1 | 6/2005 | Rennick et al. |
| 2005/0174792 | A1 | 8/2005 | Matsuura |
| 2006/0146555 | A1 | 7/2006 | Inaba |
| 2009/0013922 | A1 | 1/2009 | Lin |
| 2009/0040306 | A1 * | 2/2009 | Foote ................ B60R 1/082 348/148 |
| 2010/0085147 | A1 | 4/2010 | McCall |
| 2010/0185341 | A1 | 7/2010 | Wilson et al. |
| 2011/0027367 | A1 | 2/2011 | Graeber et al. |
| 2012/0280528 | A1 | 11/2012 | Dellock et al. |
| 2016/0042150 | A1 | 2/2016 | Moloughney |
| 2016/0046289 | A1 | 2/2016 | Elbs |

FOREIGN PATENT DOCUMENTS

| DE | 102006039182 A1 | 3/2008 |
|---|---|---|
| DE | 102007000371 A1 | 3/2008 |
| DE | 102006048503 A1 | 4/2008 |
| DE | 102008005702 A1 | 7/2009 |
| DE | 102010007848 A1 | 9/2010 |
| DE | 202014105473 U1 | 11/2014 |
| EP | 1304260 A1 | 4/2003 |
| EP | 1916154 A1 | 4/2008 |
| EP | 2221219 A1 | 8/2010 |
| EP | 2740632 A1 | 6/2014 |
| GB | 2530852 A | 4/1916 |
| JP | H06298003 A | 10/1994 |
| RU | 143731 U1 | 7/2014 |
| WO | WO 2016/012651 A1 | 1/1916 |
| WO | WO 2007/122544 A1 | 11/2007 |
| WO | WO 2008/137634 A1 | 11/2008 |
| WO | WO 2015/090330 A1 | 6/2015 |

* cited by examiner

EXTERIOR REARVIEW DEVICE WITH ILLUMINATION FUNCTIONS AND AUTONOMOUS VEHICLES USING SAME

CROSS-REFERENCE TO RELATED ART

This application is a continuation-in-part of U.S. patent application Ser. No. 15/865,964, filed Jan. 9, 2018, and this application is a continuation-in-part of U.S. patent application Ser. No. 15/391,026, filed Dec. 27, 2016, which is a continuation-in-part of U.S. patent application Ser. No. 14/129,559, filed Feb. 10, 2014 and now U.S. Pat. No. 9,527,431, which is a National Stage Entry of International Patent Application No. PCT/EP2012/062360, filed Jun. 26, 2012, which claims the benefit of foreign priority to German Patent Application No. 10 2011 105983.4, filed Jun. 29, 2011, each of which is hereby incorporated by reference in its entirety for all purposes.

BACKGROUND

1. Field of the Invention

The following description relates to exterior rearview devices with adaptive illumination functions and autonomous vehicles using such exterior rearview devices.

2. Related Art

There are various systems available today for adaptive lighting of a vehicle. These systems seek to provide dynamic front-lighting, or curve lighting functionality, for a vehicle.

The systems that are currently available typically use mechanical systems to provide the curve lighting functionality. For example, motors, such as stepper motors, may rotate a lens, a reflector, a mount, or a light source of a headlamp, or an entire light module. The stepper motors may receive signals to steer the light beam in horizontal and/or vertical directions. A particular steering angle of the light beam may be defined as a function of vehicle speed and steering wheel angle. In addition, a typical range of rotation of the light beam may be ±15 degrees left/right and ±15 degrees up/down. As a result, a roadway may be more effectively illuminated by the curve lighting functionality, thereby increasing safety and comfort.

German Patent Application No. DE 10 2006 039 182 A1 describes a vehicle having a light radiating device with two or more LED segments, and a control device to vary the emitted radiation intensity of the LED segments.

An adaptive front-lighting system that is referred to as "Pixel Light" has also been proposed. In this system, micro mirror devices each reflect one pixel of a light beam. Further, the light beam is fixed in place but can be programmed to suit the conditions in front of a vehicle. International Published Patent Application No. PCT/IB2007/051355 describes a system that places a liquid crystal element in front of a light source in order to steer the light beam.

A system having at least one semiconductor light source is known from EP 2221219, said semiconductor light source being integrated in a specified position in a daytime running light module of the vehicle. This means that the at least one semiconductor light source is arranged in the daytime running light module in a fixed or stationary position. In order to produce the curve light and/or deflecting light function, the at least one semiconductor light source is not rotated or pivoted, but remains connected to the vehicle.

All of the known solutions for active curve lighting have the disadvantage that an area to the side of the vehicle cannot be illuminated due to the mounting position of the headlamp.

US Patent Application Publication No. 2012/0081915 to Foote, et al, describes a vehicle exterior mirror having auxiliary lighting modules used optionally for various lighting functions including, for example, a turn signal indication of intent to turn, additional front and side lighting in the event of a turning steering angle or turn signal activation, reverse lighting in the event of engaging reverse gear, and a security or "puddle" light directed downwardly adjacent the side of the vehicle. In some variations, a user may exert some control over the lighting modules or functions via dashboard controls or by use of a key or remote key fob.

US Patent Application Publication No. 2011/273671 to Chu describes a projector for lighting a vehicle side or displaying a "sign" adjacent the vehicle. In one embodiment, the projector is located on a side-view mirror. The projector is turned on to project a sign on the ground in an area beside the vehicle 4 and light up the area, with the door closed. The sign is determined by the pattern or mask integrated within the projector.

EP 2740632 describes a lateral rearview mirror system for a vehicle and a corresponding application program product for operating the lateral rearview mirror system. The rearview system includes a projector such as a laser beamer for projecting an image to the environment of the vehicle. This way, an enhanced visual presentation and communication of information is achieved.

With respect to autonomous vehicles, automated driving and the use of autonomous vehicles has become more common. The most important and frequently investigated challenge is the transition from automated driving to manual or assisted-only driving. For such transitions, the vehicle must quickly hand over control and assess the fitness of the user for handling the driving. Further, in the event of a potentially dangerous situation that is too complex to be handled by the computers, the software, or automated driving, the vehicle must very quickly assess the user's fitness and hand back manual or assisted control.

According to recent studies, the rate of so-called autonomous vehicle "disengagements" has dropped from 0.8 disengagements per 1,000 miles in 2015 to 0.2 disengagements per 1,000 miles in 2016 (Waymo report). Other studies report significantly higher rates. The definition of disengagement may vary according to the particular study; the department of motor vehicles ("DMV") defines disengagements as deactivations of the autonomous mode in two situations: (1) when a failure of the autonomous technology is detected; or (2) when the safe operation of the vehicle requires that the autonomous vehicle test driver disengage the autonomous mode and take immediate manual control of the vehicle.

Typical systems and methods for handing back control of autonomous vehicles include audio and visual systems where a sound or visual alert is initiated so that the driver is signaled to retake control. However, such systems are insufficient at least because they fail to ensure the fitness of the driver and the safety of handing back control to the driver in a particular situation prior to handing back control. In addition, other systems merely describe the selection of a driving mode as in United States Patent Application Publication No. 2017/0329331.

Referring to Table 1 below, example causes for disengagements include for weather conditions, reckless behaving road users, unwanted maneuver of the vehicle, perception discrepancy, incorrect behavior prediction of other traffic participants, software discrepancies, constructions zones, emergency vehicles, and debris in the roadway, among others.

The exterior rearview system may light functions that are adaptive in nature, and are displayed automatically and passively in response to data input received from environ-

TABLE 1

Disengagements by Cause

| CAUSE | Dec '15 | Jan '16 | Feb '16 | Mar '16 | Apr '16 | May '16 | Jun '16 | Jul '16 | Aug '16 | Sep '16 | Oct '16 | Nov '16 | Total |
|---|---|---|---|---|---|---|---|---|---|---|---|---|---|
| disengage for weather conditions during testing | 1 | 0 | 0 | 0 | 0 | 0 | 0 | 0 | 0 | 0 | 0 | 0 | 1 |
| disengage for a recklessly behaving road user | 0 | 0 | 1 | 0 | 0 | 1 | 2 | 0 | 2 | 1 | 2 | 1 | 10 |
| disengage for unwanted maneuver of vehicle | 0 | 2 | 4 | 0 | 2 | 2 | 2 | 10 | 5 | 1 | 2 | 0 | 30 |
| disengage for a perception discrepancy | 0 | 3 | 1 | 1 | 1 | 2 | 2 | 3 | 1 | 2 | 2 | 2 | 20 |
| disengage for incorrect behavior prediction of other traffic participant | 0 | 1 | 0 | 0 | 0 | 1 | 0 | 1 | 1 | 0 | 1 | 1 | 6 |
| disengage for a software discrepancy | 1 | 0 | 1 | 4 | 3 | 4 | 2 | 8 | 8 | 7 | 8 | 5 | 51 |
| disengage for construction zone during testing | 0 | 0 | 0 | 0 | 0 | 0 | 1 | 0 | 0 | 1 | 0 | 0 | 2 |
| disengage for emergency vehicle during testing | 0 | 0 | 0 | 2 | 0 | 0 | 0 | 0 | 0 | 0 | 0 | 0 | 2 |
| disengage for debris in the roadway | 0 | 0 | 0 | 0 | 0 | 0 | 0 | 2 | 0 | 0 | 0 | 0 | 2 |
| Total | 2 | 6 | 7 | 7 | 6 | 10 | 9 | 24 | 17 | 12 | 15 | 9 | 124 |

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. In one aspect, a mounting assembly for an exterior attachment device which offers particularly good protection against theft of such external attachment devices is described.

In an aspect, a vehicle exterior rearview system includes a housing adapted for mounting to an exterior side of a vehicle, the housing holding at least one of a reflective mirror surface and a display screen for displaying to a driver an image of the area to the side and rear of the vehicle, one or more lighting modules disposed in said housing and providing at least one first lighting sector for implementing a turn-signal indicator and at least one second lighting sector for implementing one or more of an adaptive cornering light illuminating a forward sector or an adaptive security light illuminating a downward and rearward sector, and a control system for (a) receiving input data about vehicle status parameters from vehicle status sensors, (b) receiving input data about the vehicle's environment conditions from environmental sensors; and (c) adaptively activating the second lighting sector in response to the input data.

The vehicle exterior rearview system may have a lighting module that contains a plurality of LEDs for providing different lighting functions in several directions, or it may have a single LED or light source that is directed to multiple locations via light guides or optical fibers. The lighting sector functions that may be achieved by the various lighting modules may include a turn signal blinker light, and adaptive cornering light, a daytime running light, a security light, a reverse gear indications, side marker lights, an interior light, or any combination of these.

mental or vehicle sensors. In another example, certain lighting functions, including the security light function, may displays illumination or a message responsive to data input received from a user input device. Suitable user input devices may include a key, a remote key fob, or a smartphone or tablet device. The user may thus control at least one of color, shape, intensity, and timing of lights activated for the security light function in response to user input.

In another aspect, a light module and illuminating means includes one light source and light guides such as optical fibers and/or a plurality of light emitters to direct light to various spots and/or in various colors and/or with various brightness, outside and/or inside the vehicle and/or to illuminate the ground through rocker panel, bumper, sidecamera housing for providing logo, messages/alerts, light patterns, keyboard (for opening the car), spot light on user when moving (illuminating path at night).

In yet another aspect, a control system receives input data from user (customer/driver) via smartphone (app) or other interface, generates messages/light patterns depending on user identity, daytime, weather conditions, and/or receives signals from sensor detecting gestures, movement and/or identity of users (pictures detection, detection of key, phone . . . ), weather condition, approaching objects, etc.

In an additional aspect, an autonomous vehicle system includes an eye or face tracking sensor for tracking a user's movements or expressions, a head up display for displaying information to the user, an instrument cluster for providing driving measurements of the autonomous vehicle, a time of flight sensor, a camera monitor system for displaying a side or rear view of the vehicle, and a control unit to communicate with the eye or face tracking sensor, the head up display, the time of flight sensor, and the camera monitor system when receiving a request to turn over driving controls to the user.

In response to receiving a request to turn over driving controls to the user, the control unit may activate an indicator requiring the user to look towards a predetermined position.

The predetermined position may be a position on at least one of the head up display, the instrument cluster, the camera monitor system, and an exterior or interior mirror.

The eye or face tracking sensor may track the user's movement or position to confirm that the user is looking towards the predetermined position.

The eye or face tracking sensor may track a change in the user's expression to confirm that the user is aware of a surrounding circumstance.

In response to detecting a bad weather condition, the control unit may activate an indicator requiring the user to look first towards the head up display and then towards the camera monitor system or the instrument cluster.

The camera monitor system may include a left camera monitor system and a right camera monitor system, and in response to detecting a reckless driving vehicle, the control unit may activate an indicator requiring the user to look first towards one of the left or right camera monitor systems and then towards the instrument cluster or the other of the left or right camera monitor systems.

In response to detecting an unexpected or unpredicted maneuver from another vehicle, the control unit may activate an indicator requiring the user to look first towards the instrument cluster and then towards the camera monitor system.

In response to detecting a software malfunction, the control unit may activate an indicator requiring the user to look first towards the instrument cluster and then towards the head up display and the camera monitor system in no specific order.

In response to detecting an obstacle in a driving path, the control unit may activate an indicator requiring the user to look first towards the head up display and then towards the instrument cluster and then towards the camera monitor system.

In a further aspect, a method of handing driving control to a user using an autonomous vehicle system includes detecting a condition in which it is preferred that the user have driving control, receiving, using a control unit, a signal indicating that the detected condition has been detected, initiating a hand-control-to-user protocol in response to receiving the signal comprising communicating, using the control unit, with at least one of an eye or face tracking sensor, a head up display, a time of flight sensor, and a camera monitor system, and handing driving control to the user upon successful completion of the hand-control-to-user protocol.

The hand-control-to-user protocol may further include activating an indicator requiring the user to look towards a predetermined position.

The predetermined position may be a position on at least one of the head up display, the instrument cluster, the camera monitor system, and an exterior or interior mirror.

The hand-control-to-user protocol may further include tracking, using the eye or face tracking sensor, the user's movement or position to confirm that the user is looking towards the predetermined position.

The hand-control-to-user protocol may further include tracking, using the eye or face tracking sensor, a change in the user's expression to confirm that the user is aware of the detected condition.

The hand-control-to-user protocol may further include activating an indicator requiring the user to look first towards the head up display and then towards the camera monitor system or the instrument cluster in response to detecting a bad weather condition, and detecting that the user actually looked at the indicator using the eye or face tracking sensor.

The hand-control-to-user protocol may further include activating an indicator requiring the user to look first towards a left or right camera monitor system and then towards the instrument cluster or the other of the left or right camera monitor system in response to detecting a reckless driving vehicle, and detecting that the user actually looked at the indicator using the eye or face tracking sensor.

The hand-control-to-user protocol may further include activating an indicator requiring the user to look first towards the instrument cluster and then towards the camera monitor system in response to detecting an unexpected or unpredicted maneuver from another vehicle, and detecting that the user actually looked at the indicator using the eye or face tracking sensor.

The hand-control-to-user protocol may further include activating an indicator requiring the user to look first towards the instrument cluster and then towards the head up display and the camera monitor system in no specific order in response to detecting a software malfunction, and detecting that the user actually looked at the indicator using the eye or face tracking sensor.

The hand-control-to-user protocol may further include activating an indicator requiring the user to look first towards the head up display and then towards the instrument cluster and then towards the camera monitor system in response to detecting an obstacle in a driving path, and detecting that the user actually looked at the indicator using the eye or face tracking sensor.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The term "rear view" is here defined as a view of the surrounding area, which is not in the field of view of a driver, i.e. the directions opposing, left, right, below and above of the viewing direction, but can also include the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Reference to a "first" or a "second" or a "third" element, such as in connection with a first and second lighting sector or light function, is not intended to imply any order, but is simply a label to distinguish one from another.

Figure 1:
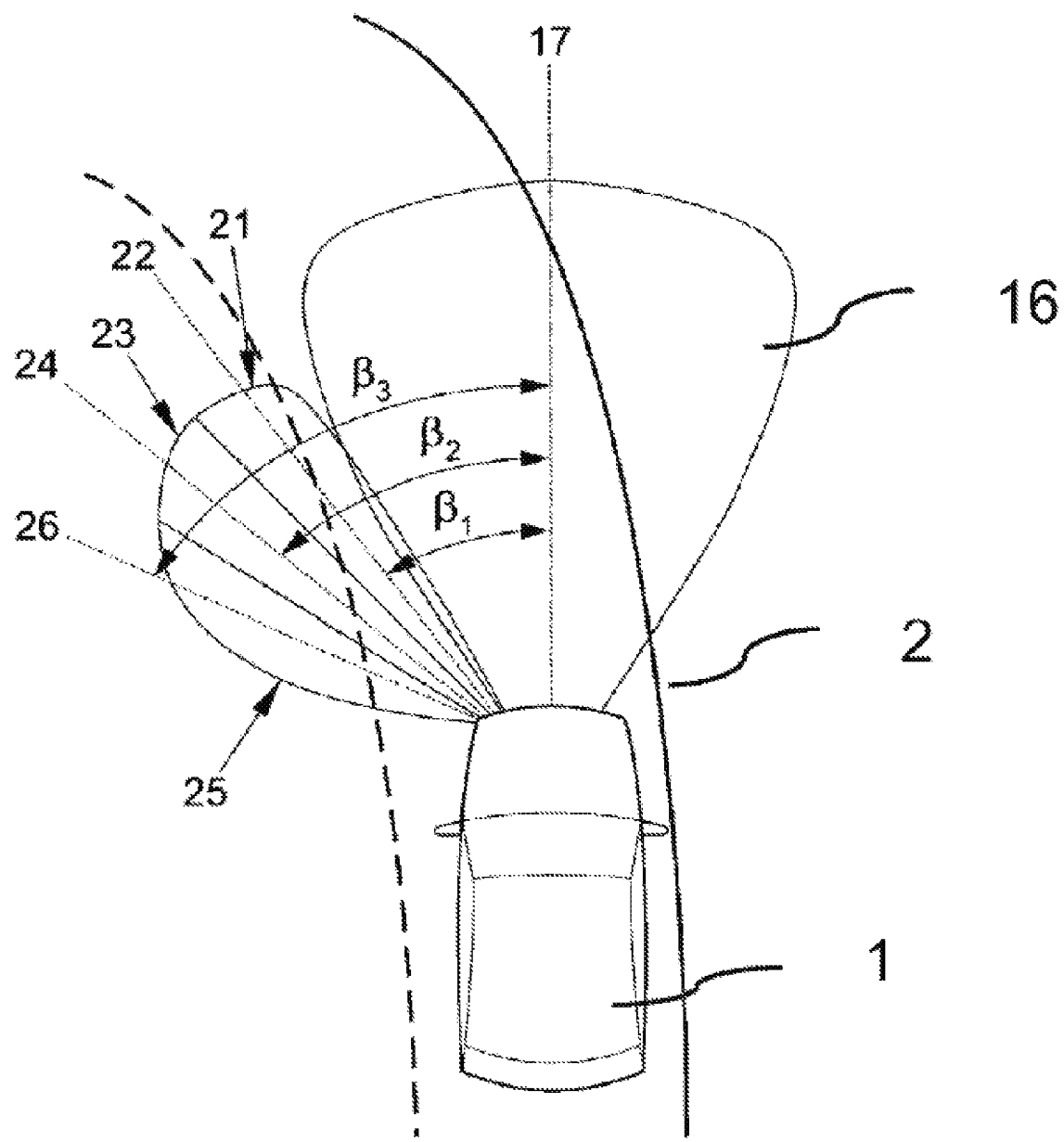
FIG. 1 is a diagram illustrating a schematic top view of an example of a lighting distribution using a system for electronic adaptive front-lighting of a vehicle.

FIG. 1 shows a schematic top view of a lighting distribution using a system for electronic adaptive front-lighting of a vehicle. This figure illustrates a driving situation in which the vehicle 1 is driving along a roadway 2 curving towards the left. In addition, this figure illustrates an example embodiment of an electronic adaptive front-lighting system LED module in the headlamp with three different light sectors L1, L2, L3. As used herein, "adaptive" lighting or "adaptively controlled" refers to lighting that changes passively in response to a measured parameter or external stimulus, but not in direct response to control by a user. For example, in the adaptive headlamps mentioned herein, the headlamps change their angle in response to a steering angle change, not in direct response to a user's actions, even though the user is responsible for changing the steering angle by turning a steering wheel.

The primary objective of the user is to steer the vehicle and only by a secondary passive or "adaptive" feature do the headlamps turn as well.

Each of the light sectors L1, L2, L3 may be illuminated by one or more LEDs, based on the LED type and the amount of light required for each sector. In addition, the light intensity of each of the light sectors may be independently controlled. In this manner, the light distributions 16, 21, 23, 25 may be optimally controlled based on a particular driving situation, such as a vehicle speed, a steering wheel angle, a proximity to other vehicles, a selected driving comfort/behavior pre-programmed, an actuation of an input device such as a switch or any other human-machine interface, or road characteristics such as curvature or width, etc.

Figure 2:
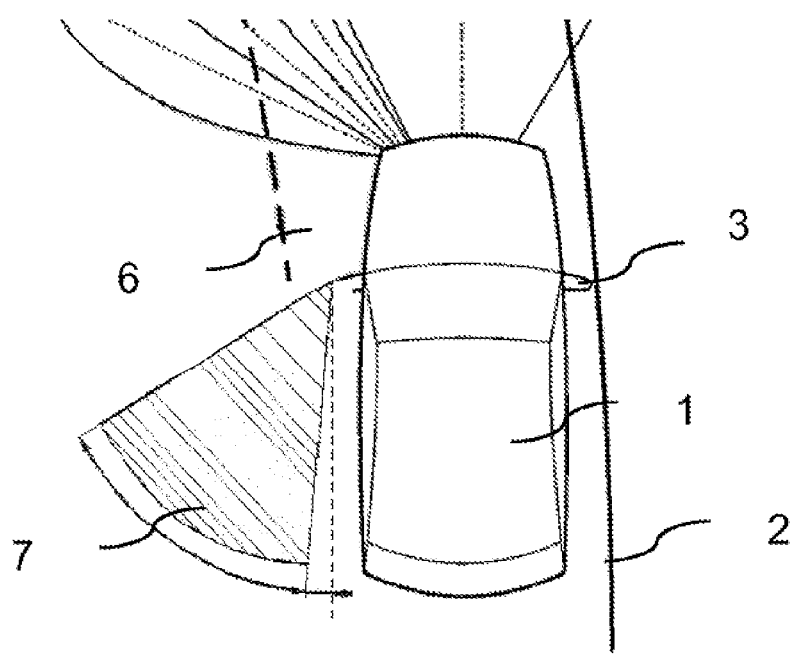
FIG. 2 is a diagram illustrating an example of the illumination distribution areas of a vehicle.
Figure 3:
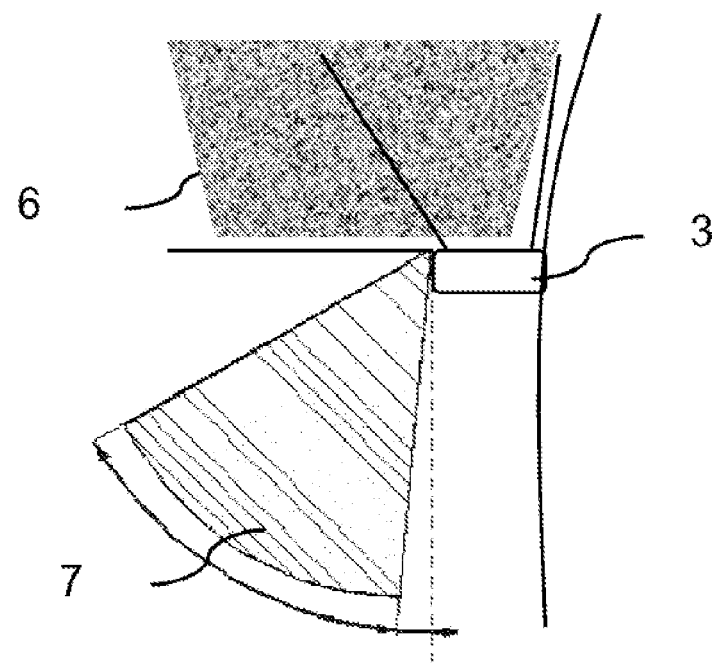
FIG. 3 is a diagram illustrating an example of the illumination distribution areas of the adaptive cornering light.

FIG. 2 illustrates the area to the left alongside the vehicle 1. Exterior rearview devices 3 are arranged on both sides of the vehicle. The rearview devices 3 include one or both of a mirror and a display screen. The rearview devices 3 further include turn-signal blinkers which illuminate the shaded area 7, which extends in a rearward quadrant between 5 degrees from the longitudinal axis of the vehicle and 55 degrees away from it. This illumination may be achieved with the lights or LEDs for outboard light sector LS (see FIG. 4).

The entire area between the illuminated distributions 16, 21, 23 and 25 of the headlamps is not lit up. However, if the vehicle wants to turn, the adaptive feature of the headlamps is not adaptive enough to light up the area of the roadway immediately adjacent to the vehicle side (e.g. area 6). For this purpose, a further light source for light sector L4 is used in the exterior rearview device 3. This light sector L4 illuminates an area 6 which extends at least outwardly from the extension of the exterior mirror or display device 3 to the bodywork contour adjacent the side of the vehicle in front of the rearview device 3.

Figure 4:
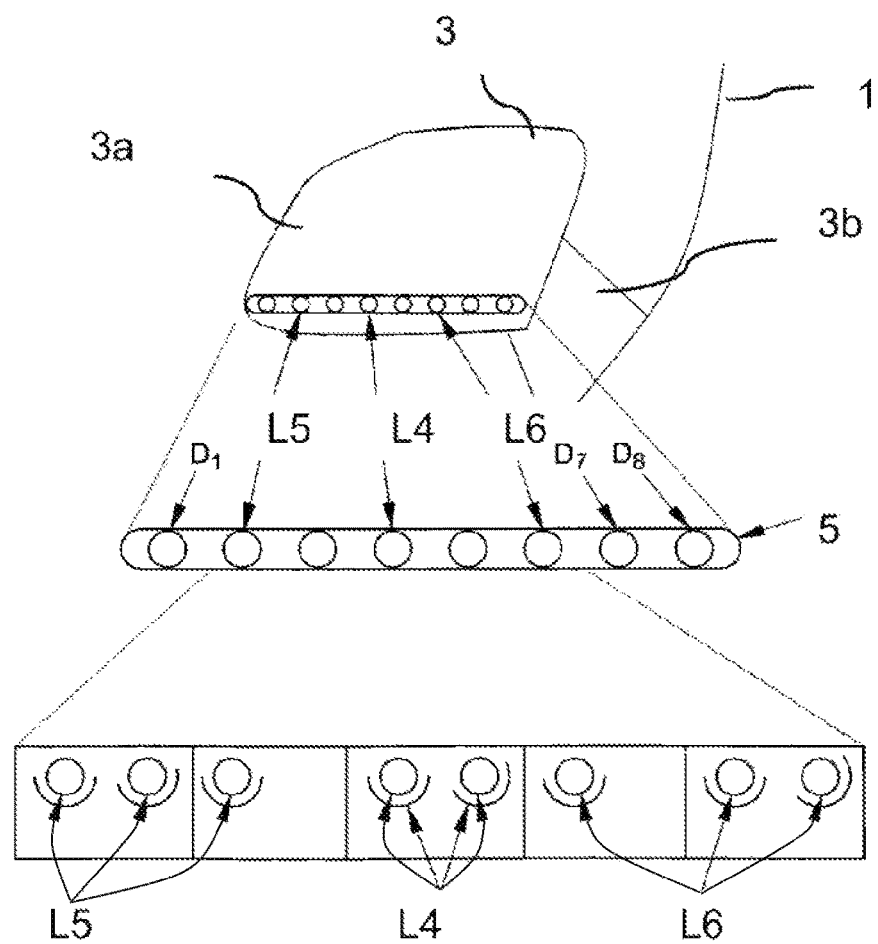
FIG. 4 is a diagram illustrating an example of the lighting according to an embodiment.

FIG. 4 illustrates an example embodiment of an external rearview device 3 for adaptive lighting of a vehicle. The rearview device 3, in this example, includes a mirror head 3a, which includes a reflecting element on its side which is not visible in the drawing, and a mirror base 3b with which the exterior mirror is mounted on the vehicle 1. The vehicle 1 is indicated in the drawing with a sketched contour. The exterior mirror 3 contains a lighting module 5 which, in this example, extends along the longitudinal axis of the exterior mirror, which leads away from the vehicle. In this example, the lighting module 5 may include a turn-signal blinker, a side marker light source, an integrated daytime running light (DRL) and an adaptive cornering light.

As shown in this example embodiment, the integrated daytime running light (DRL), the turn-signal blinker, and the adaptive cornering light include LEDs D1 to D8 arranged to also provide light sectors L4, LS, and L6. The light sectors L4, LS, L6 contain LEDs, in order to illuminate areas forward and to the left of the vehicle mirror for the driving situation in which the vehicle is driving along a roadway curving towards the left. In this example, the functional light sectors L4 to L6 may each share the same LED location (i.e.

D1 to D8) as the functional daytime running lights. As shown in FIG. 4, light sector LS (e.g. which may provide the turn-signal function in some embodiments) shares the same location as daytime running light LED D2; light sector L4 (e.g. which may provide the adaptive cornering light function in some embodiments) shares the same location as daytime running light LED D4, and light sector L6 shares the same location as daytime running light LED D6, and may provide this functionality.

Further, FIG. 4 schematically illustrates optical elements as semicircular elements. The optical elements are utilized to direct the light of each DRL LED and each cornering light LED in a particular direction. The optical elements include reflectors, lenses, etc. It should be understood that the lighting module S is not limited to the illustrated example embodiment. The number of light sectors Lx may be varied, and the arrangement of the light sectors Lx may also be varied, such as horizontally, vertically, diagonally, in a straight line, in a curved line, etc.

Furthermore, for any given light functionality (such as turn signal blinker, adaptive cornering light, daytime running light (DRL), side marker light, reverse gear indication, or security ground light) the illumination may be supplied by one or more LEDs or light sources, depending on the complexity desired. If a single light source is used for any given light functionality, the light may be distributed more evenly and broadly by the use of elements such as diffusers, lenses, optical fibers, light guides or wave guides, and/or reflectors. This has a benefit of simpler manufacturing and maintenance of light sources like LEDs, and can still accomplish color and/or intensity variations at the output by means of filters, lenses, or diffusers.

In another embodiment, the lighting module S in mirror 3 only contains a turn-signal blinker and an adaptive cornering light. As a result, only two light sectors are defined, but both may, in each case, contain light sources for the other function respectively. Since the blinking function must emit amber-colored light, the LEDs which perform the blinking function are provided only for this specific function.

In addition to the arrangement and sufficient number of LEDs for the different functions, the control system for using the adaptive cornering light in the rearview device is important. Since it only makes sense to use the cornering light during sharp turning maneuvers in dim lighting situations, it is expedient to couple the activation of the adaptive cornering light with environmental and vehicle parameters and, for example, with the daylight levels and vehicle speed. For example, it makes sense to activate the adaptive cornering light in the exterior mirror only below a threshold speed. Other environmental parameters that might be relied upon to activate the adaptive lighting include fog, rain, snow, sleet, cloudy or overcast conditions, and darkness or twilight. Other vehicle parameters that might be relied upon to activate the adaptive lighting include vehicle speed (below a threshold), steering angle (above a threshold), activation of turn indicator signaling an intentions to turn, and activation of daytime running light and/or headlights.

The lighting module 5 is controlled by means of a control module in the door or a controller in the exterior rearview device, which receives data via a bus system. Input data is fed into the control unit. This input data includes vehicle data such as, for example, vehicle speed, steering wheel angle, and environmental data, such as road characteristics, illumination levels, weather, etc. The control unit then controls each of the adaptive light sectors Lx of the left and right lighting module, independently of each other, to turn on or off each of the LED light sectors and/or to vary their light intensity.

In an example, a useful control system is obtained if the following vehicle parameters are met: The vehicle is stationary or only moving at low speed, for example up to 30 km/h; the turn signal is activated and the running light is on; the steering angle is greater than a threshold value. This set of parameters defines a sharp turn at low speed in poor visibility and results in the adaptive cornering light being activated.

Figure 5:
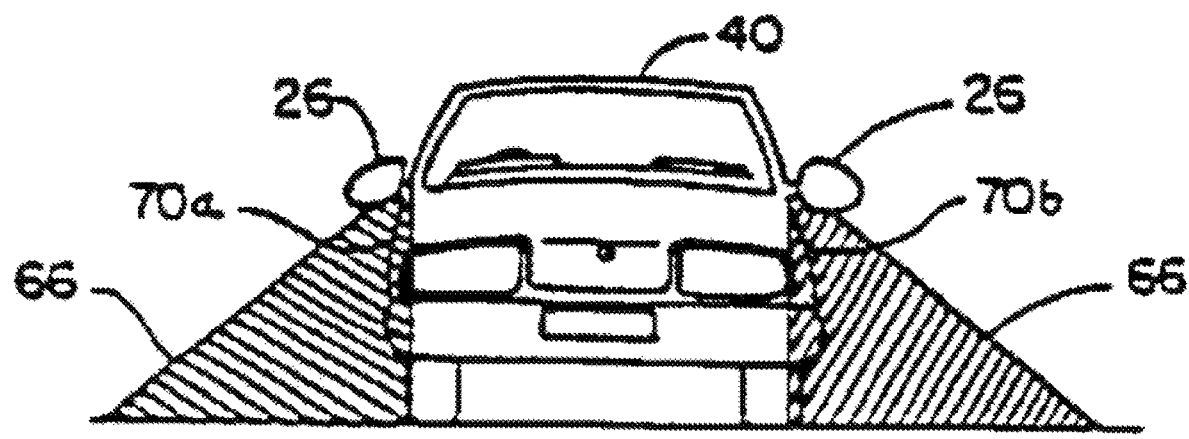
FIG. 5 is a diagram illustrating an example of the illumination distribution areas of the security light.

In another example, a security light function may be provided. A security light is also known as a "puddle light" and generally illuminates one or both sides (70a, 70b) of a vehicle 40 near the doors (see FIG. 5). Security lights have been provided in rearview mirrors 26 and are directed downwards and slight rearwards to illuminate an area 66 and the ground adjacent the side of the vehicle 40. Lighting sector L7 (not shown), may be disposed in the bottom side of a rearview device 3 and may be used to illuminate area 66. The lighting sector L7 may include one or more LEDs or light sources and the illumination may be diffused or directed by optical fibers, lenses, light guides, reflectors, etc. as with any of the other light sectors. In other examples, security lights may be installed in rocker panels, fenders, doors or other exterior locations of the vehicle.

Although the security light sector L7 is generally used when the vehicle is stationary, it may also be linked to the turn signal indicator in order to display an arrow or other warning signal along the ground adjacent the vehicle to signal to approaching vehicles or bicycles that the equipped vehicle is about to make a turn procedure. US Patent Application Publication No. 2005/117364 describes a system for displaying arrows along the ground in cooperation with a turn signal to indicate that a turn is intended.

In another example, an interior lighting function may be provided by one or more light sectors L8. While it is possible that light sectors L8 may be housed in the rearview device 3, they may also be housed within the cabin or interior of the vehicle itself.

Such interior light may be found in the interior of doors, along flooring or header materials, under the dashboard or under seating, or anywhere else within the interior of a vehicle.

Interior lighting, if all associated with one lighting function (such as door opening) may be driven by one light source using optical fibers or light guides to direct the light to each of the output locations. This may have the advantages of reducing light intensity and simplifying maintenance of just a single light source.

In some embodiments, both the security lighting function L7 and the interior lighting function L8 may be "adaptive" to vehicle or environmental conditions. For example, upon sensing an entry remote within a defined proximity at night, a security light may automatically illuminate to direct the user to the vehicle for entry. Interior lighting may operate in a similar manner if desired. In some cases of security light sector L7, the illumination may contain a message such as an alert or warning. The message may be selected by a vehicle controller module based on environmental and/or vehicle status conditions. In this case, the message may include an alert such as a weather alert to advise the driver as to fog, snow, sleet, ice or other adverse or dangerous driving conditions. In other situations, the message may be a vehicle status alert such as one warning of low tire pressure or low oil or coolant levels, or a need for service. Alternatively, the message may be a logo or graphic design selected by the vehicle manufacturer or by the user. The use of images or messages displayed in the illumination area 66 may be accomplished by suitable light sources and patterns or masks that project the message or graphic to the ground area. U.S. Patent Application Publication Nos. 2011/273671, 2010/253919, and EP Patent Application No. 2740632 A1 illustrate and describe technology for displaying messages and logos by means of a lighting system such as described above for sector L7.

In other embodiments, the security light and/or the interior lights may be controlled and customized by the user. For example, the nature of the illumination (color, intensity, content, etc.) may be selected and/or customizable by the user of the vehicle. Some users may prefer red or blue (or any other color) illumination over amber or white. The message may be a greeting, such as "Hello" or "Welcome" and may even be customizable to include the user's name if desired. Whether a message is adaptive or user-controlled, it may be the same or different on each side of the vehicle.

In yet another example, a lighting sector L9 may be used to display a message on a window or door area near the entry handle. Sector L9 may be used to display a message, much like that of the security light sector L7. However, an alternative use of lighting sector L9 is to provide an identity confirmation prior to admitting the user. For this function, L9 may display a virtual key pad for the user to enter a passcode to unlock the vehicle. US Patent Application Publication No. 2006/614582 describes such a system. Lighting sector L9 may also be used to confirm identity through a "swipe pattern" as is common on smartphones, or through an image recognition system as is described in US Patent Application Publication No. 2010/085147 or a gesture recognition. Finally, lighting sector L9 may be used to assess the sobriety of a user by means of a reflex test in which the user must, within a predetermined time limit, repeat a displayed pattern of lights, object or numerals, much like the Hasbro game "SIMON."

Figure 6:
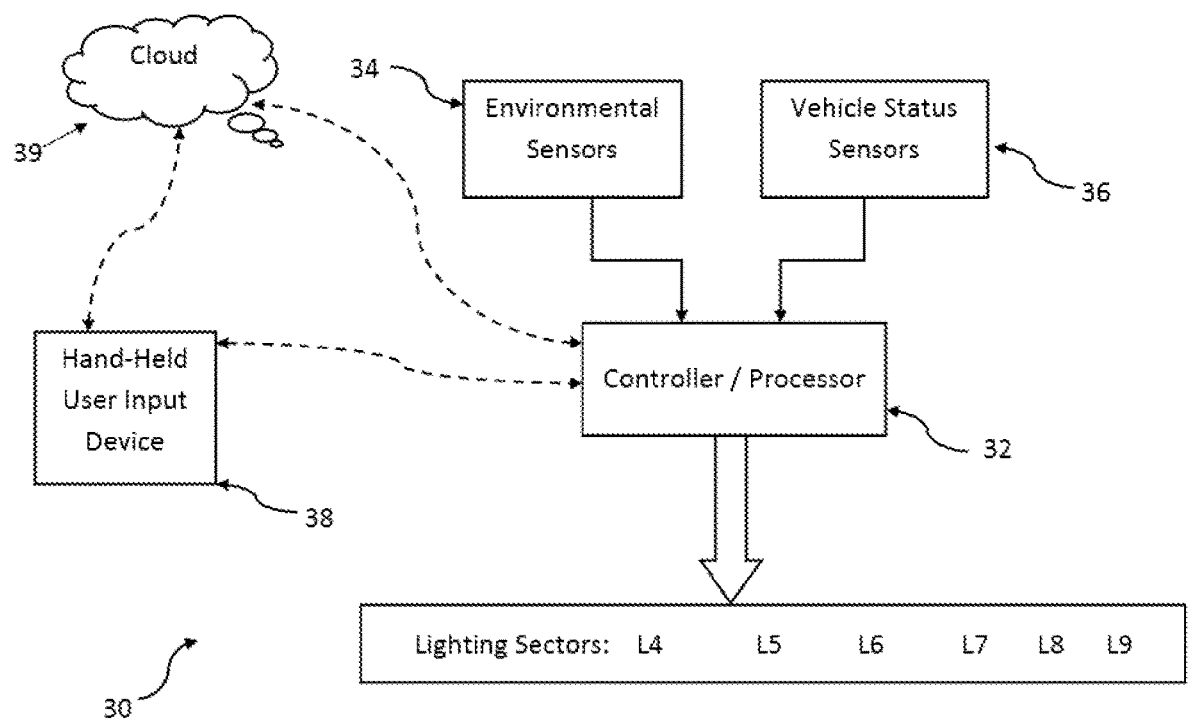
FIG. 6 is a diagram illustrating an example of a control system.

Customization and control of lighting functions (e.g. L7 and L8) may be accomplished by conventional controller electronics such as is currently employed by GM's "Onstar" and Verizon's "HUM" systems. These may use a plug in module or hard wired module having wireless transmitter and receiver functions for communicating with a hand-held user device, such as key fob or smartphone, for example. FIG. 6 illustrates a simple schematic for a representative control system 30. The brain of the control system is a computer controller or processor 32 that receives data inputs from the environmental sensors 34 and the vehicle sensors 36. As mentioned previously, the environmental sensors 34 detect conditions of light or darkness, rain, snow, fog, sleet, road conditions, proximity of a potential driver/user, or proximity an adjacent vehicle, etc. and feed this data to the controller 32. The vehicle sensors 36 detect status conditions of the vehicle itself, such as vehicle speed, steering angle, activation of lights (day time running or headlamp), activation of turn signal indicators, activation of hazard flasher lights, engine temperature, engine rpms, engine computer fault detections, oil pressure or life, tire pressure, etc. and feed these to the controller 32.

In the case of adaptive lighting controls, the processor uses this sensor input to determine which lighting sectors (L4 to L8) to activate, such as the adaptive cornering light sector L4 described above, the turn signal indicator light sector LS, the security light sector L7, or the interior lighting sector L8.

In the case of user customized lighting controls, the controller 32 may receive additional input signals from a remote, hand-held device 38 operated by the user. The hand-held user device 38 may be a smartphone having a suitable "app" or a remote key fob adapted to provide special inputs, such as by selecting a mode from a menu and then using up/down or right/left arrows to select the option for each mode, much like a certain camera menus. These control signals are shown in dashed lines in FIG. 6 to indicate that they are wirelessly conveyed, such as by a WiFi link or a Bluetooth™ technology. The user's hand-held device 38 may communicate directly with the receiver of the controller 32, or it may communicate with an application "in the cloud" 39 such as is done with "Onstar" or "Hum," and the "cloud" application then communicates with the controller 32 to deliver the signals.

As noted previously, some of the user selected inputs may include any or all of the following: Whether to enable or disable any particular feature or function; whether to display any message via a security light sector L7; what message to display, in the event a message is selected; what lighting characteristics (e.g. colors, shapes, and/or intensities) to use for both the interior lighting sector L8 and the security lighting sector L7.

As shown in FIG. 1, the low-beam light source projects a standard light distribution 16 having a center axis 17 forward of the vehicle. In addition, the light sectors L1, L2, L3 project beams of light having illumination distributions 21, 23, 25, respectively, and having center axes 22, 24, 26 of said distributions 21, 23, and 25, respectively, at angles P1, P2, P3, respectively, from the center axis 17 of the standard light distribution 16. The light distributions 21, 23, 25 illuminate areas forward and to the left of the vehicle for the driving situation in which the vehicle is driving along a roadway curving towards the left.

Figure 7:
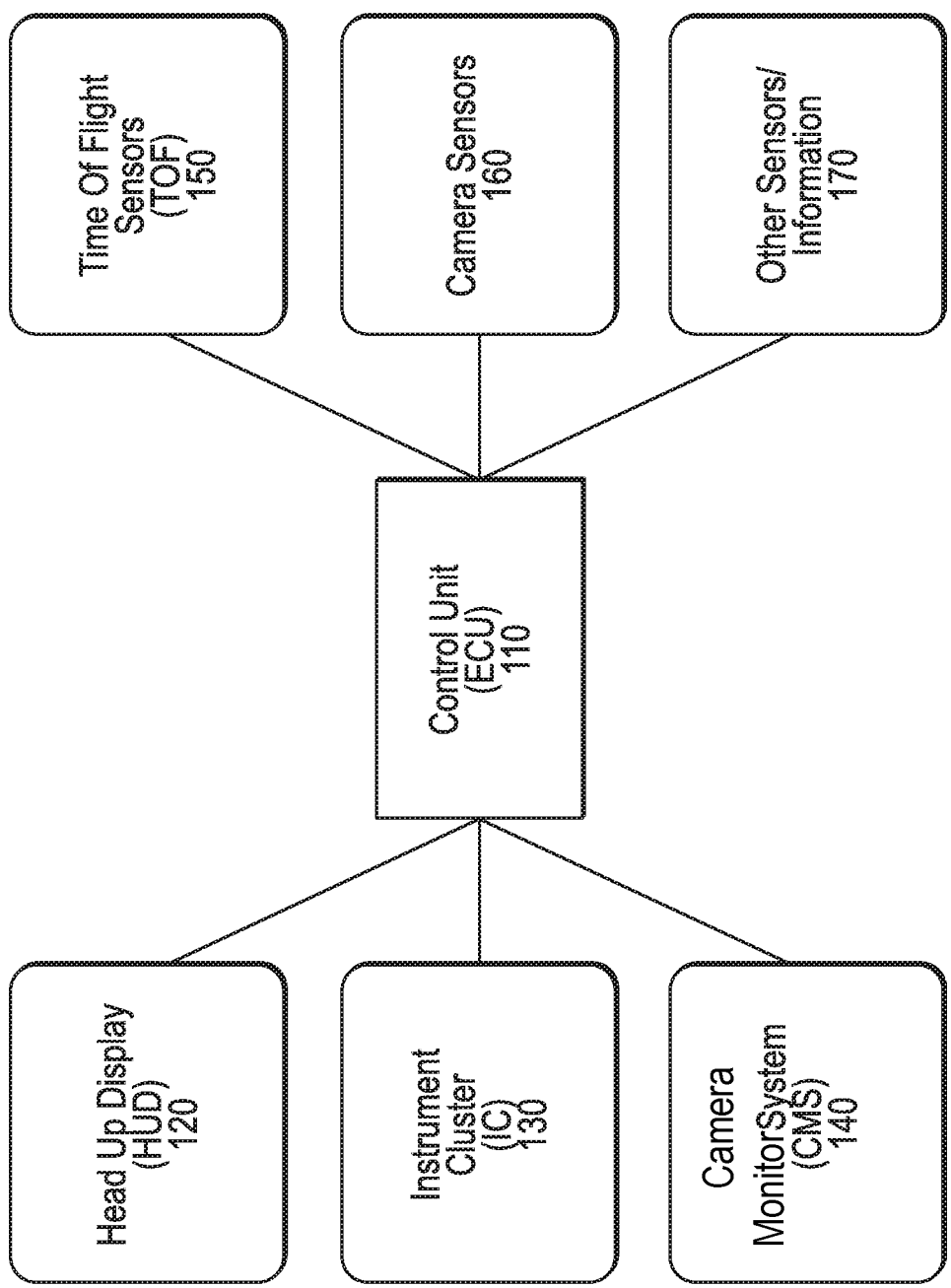
FIG. 7 is a diagram illustrating an example of the control and sensor systems of an autonomous vehicle.

Referring to FIG. 7 by way of non-limiting example, and consistent with examples of the invention, an autonomous vehicle system 100 includes a Driving Safety Control Unit (hereinafter "ECU") 110, a Head Up Display data receiver/transmitter (hereinafter "HUD unit") 120, an Instrument Cluster data receiver/transmitter (hereinafter "IC unit") 130, a Camera Monitor System data receiver/transmitter (hereinafter "CMS unit") 140, a Time Of Flight Sensor data receiver/transmitter (hereinafter "TOF unit") 150, a Camera Sensor data receiver/transmitter 160, and other data transmitting/receiving units 170.

While only one of each unit is displayed and described, it should be appreciated to a person having ordinary skill in the art that one or more units for each may be used such as one or more TOF units or one or more Camera Sensor units. Where more than one unit is used, all units may be connected to a single data receiver/transmitter or may receive and transmit data separately using individual data receivers/transmitters. It should be appreciated that while communication with the ECU is described as preferably two-way communication, communication may also be one-way from the ECU to the unit or vice versa. In addition, individual units may communicate with one another. For example, two Camera Sensor units may communicate with one another, and all units may communicate with one another such as the HUD unit communicating with the IC unit.

Still referring to FIG. 7, all units may already be units equipped in an autonomous vehicle and used for other applications. In an example, the HUD unit 120 is related to an interactive display on the windshield of the vehicle, the IC unit 130 is related to an internal console display within the vehicle which displays speed, acceleration, and other vehicle related gauges, the CMS unit 140 is related to one or more rearview or sideview display devices, the TOF Sensors 150 and Camera Sensors 160 are related to sensors used for vehicle operations, and the vehicle may already be equipped with other sensors 170 and systems which are capable of communicating with the ECU 110.

Figure 8:
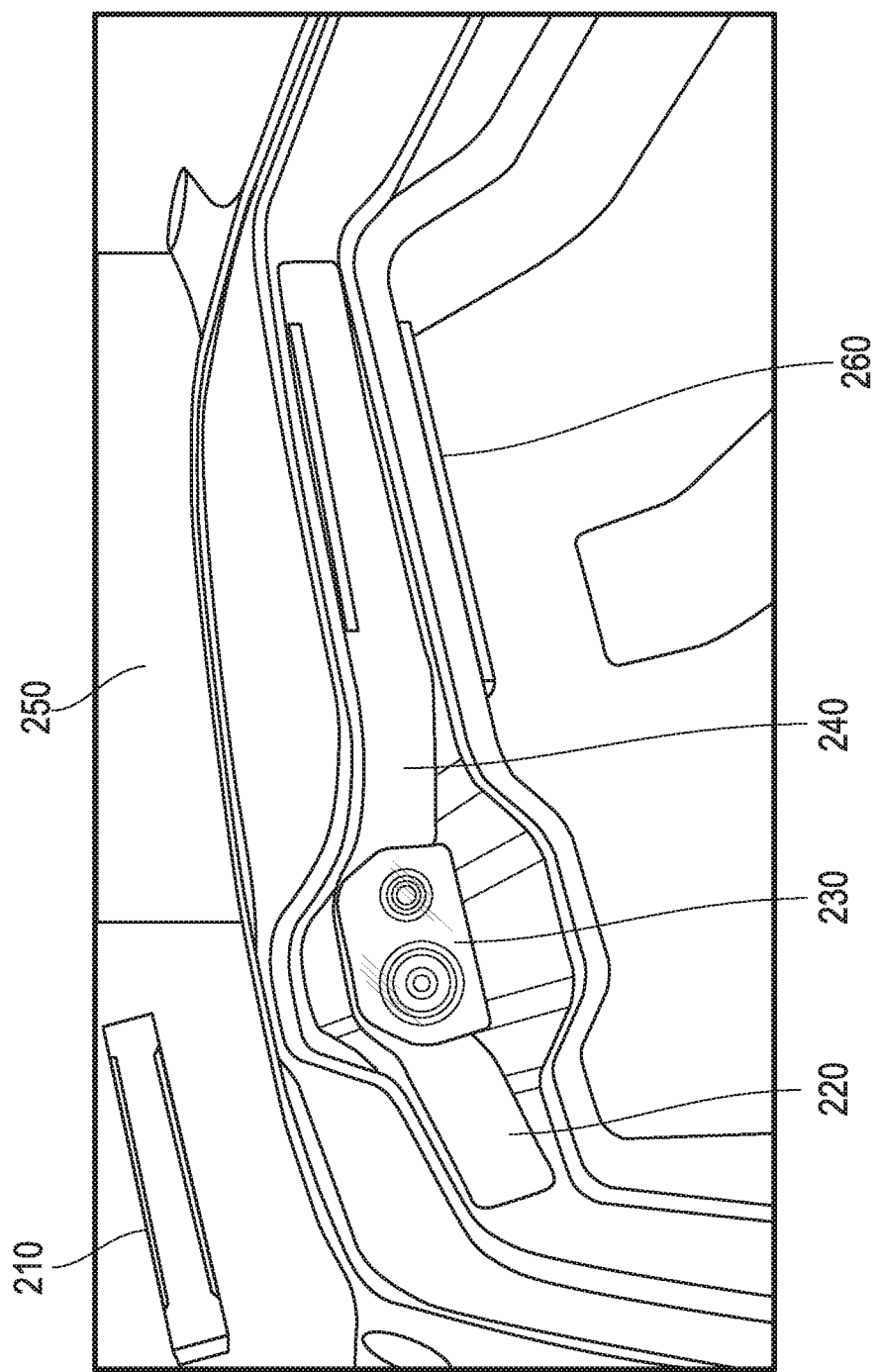
FIG. 8 is a diagram illustrating an example of an interior of an autonomous vehicle including the vehicle dashboard and other systems.

FIG. 8 is a diagram illustrating an interior of an autonomous vehicle including the vehicle dashboard and other systems according to an example of the invention.

Referring to FIG. 8, the interior 200 of an autonomous vehicle may include eye and face tracking sensor(s) 210, a left CMS display 220, a right CMS display 240, an IC display 230, a HUD 250, and TOF sensor(s) 260. The ECU 100 may receive a request to return the user to his driving tasks, then run several operations and checks to verify if the user is fit enough and familiar with the driving situation. This may be accomplished through communications between the ECU and the communication units of such described systems.

For example, the user may receive instructions by the autonomous vehicle to check all or at least one of: left and right CMS display 220, 240, an interior mirror or camera system or display, speed or status of ADAS on the IC display 230, current trajectory and driving conditions in front of the vehicle as animated by the HUD 250, and other information such as information coming from V2X communication systems.

In an example, a number of different protocols may be initiated where the user is signaled to look at a particular display or unit by an animation such as a spot being displayed or arrows that point to the direction which the user is being instructed to look. The gaze of the driver may be monitored by the installed sensors and systems, and the spot may fade away and move to the next position when it is determined by the ECU 100 that the driver has seen enough information. In some examples, the autonomous vehicle may also include physiological sensors to detect the condition of a user such as Electroencephalogram (EEG) sensors for detecting the brain activities of the user. As such, the vehicle may obtain additional data regarding whether the driver has understood the relevant situation and is aware of driving conditions.

The sequence of checks and the order in which the system instructs the user to check different units or displays may vary according to the driving situation and/or the perceived danger. In addition, the time period for which a user is required to view a certain unit or display may vary in order to shorten the time for teaching the most immediate danger to the user. In response to the system confirming that the user is in control of the situation, the automatic driving system may switch off entirely or transition to assist-only mode in order to allow the driver to control the dangerous situation until reactivated. In some examples, the system may randomly and routinely initiate training modes or fire drills in which the driver is tested of dangerous situations. Accordingly, the driver is made aware and accustomed to the potential need for having to take over control of the vehicle.

Example 1—Weather Conditions

Figure 9:
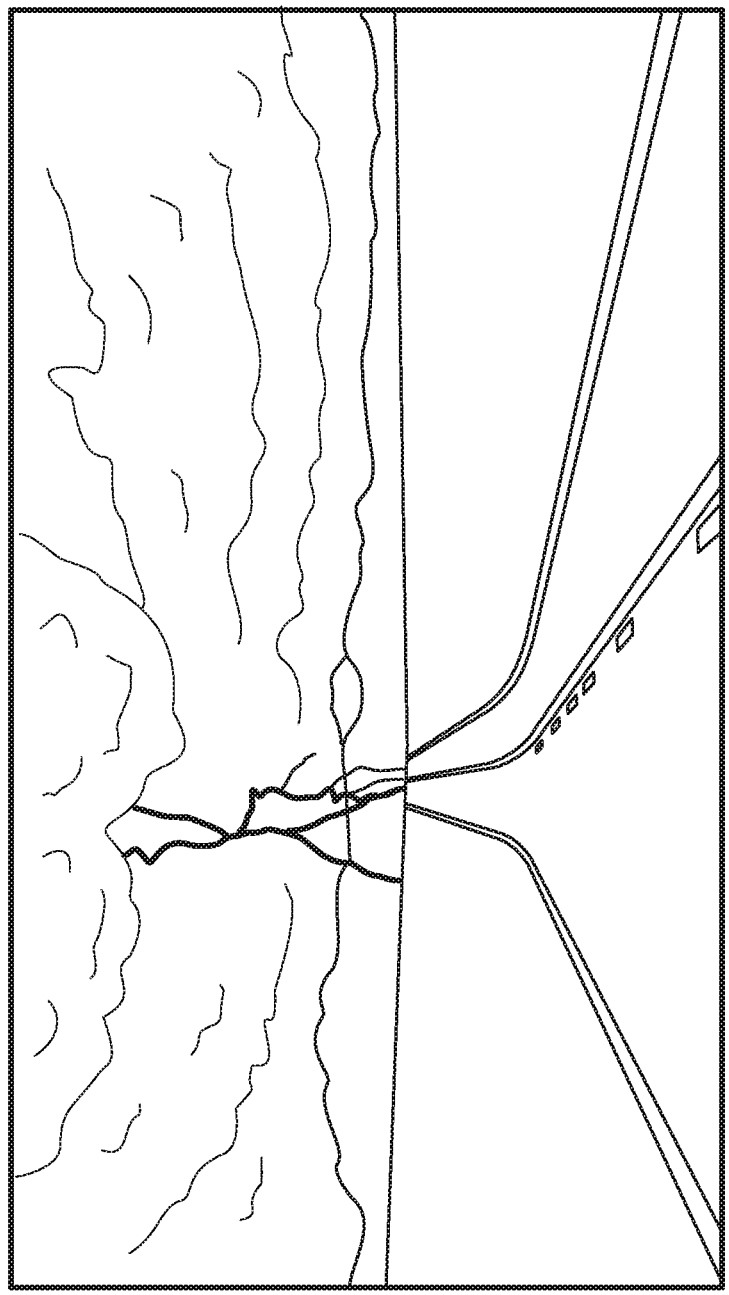
FIG. 9 is a diagram illustrating an example of a situation which may occur and be detected prior to an autonomous vehicle initiating the return control to user protocol.

FIG. 9 is a diagram illustrating an example of a situation which may occur and be detected prior to an autonomous vehicle initiating the return control to user protocol.

Referring to FIG. 9 and FIG. 8 together, in response to a vehicle in autonomous driving mode detecting bad weather conditions using one or more on-board sensors (camera, lidar, radar) or through car-to-x communication, the vehicle may initiate a return control to user protocol. In this example, the protocol may require the driver to first look towards the road and location of the weather condition as marked using the HUD 250. One or more sensors may detect that the user is properly facing the marked position on the HUD 250. The eye and face tracking sensor 210 may follow and detect the gaze of the user. An expression of the user may be registered by the eye and face tracking sensor 210 to detect whether the user is aware of the imminent danger. Subsequently, other data may be detected by additional units of the vehicle such as the left/right CMS display 220, 240 and the IC display 230 to confirm that the user is fully prepared to take over control of the vehicle.

Example 2—Reckless Drivers

Figure 10:
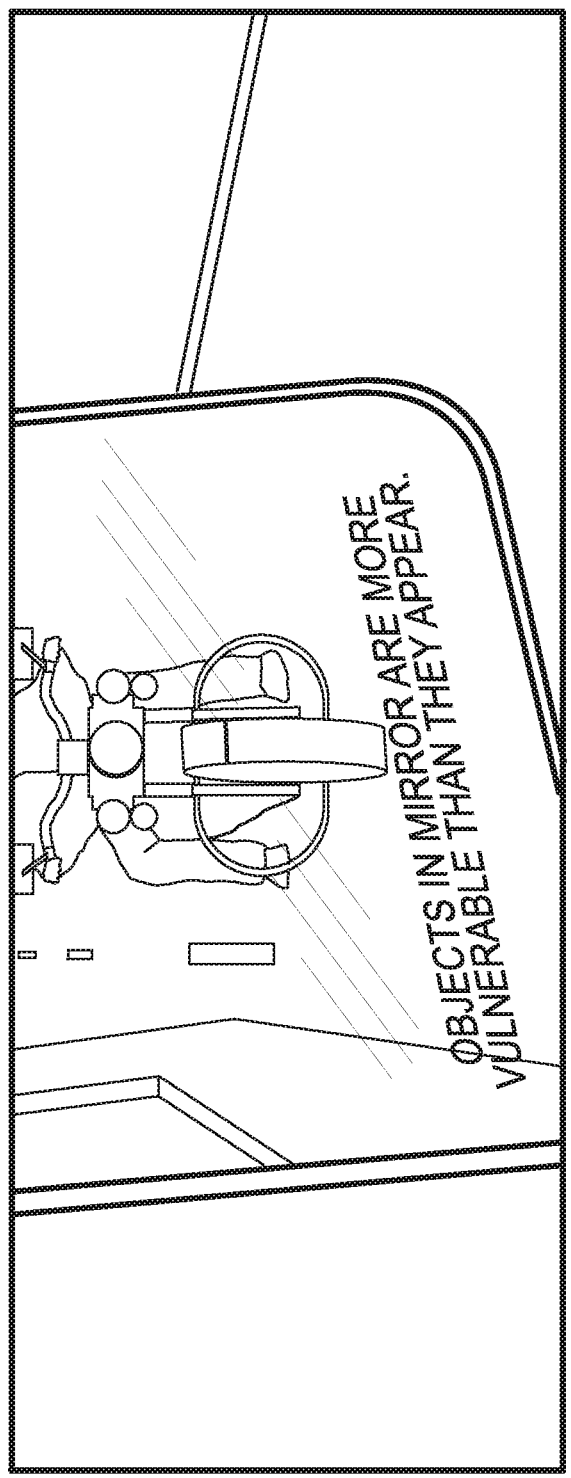
FIG. 10 is a diagram illustrating another example of a situation which may occur and be detected prior to an autonomous vehicle initiating the return control to user protocol.

FIG. 10 is a diagram illustrating another example of a situation which may occur and be detected prior to an autonomous vehicle initiating the return control to user protocol.

Referring to FIG. 10 and FIG. 8 together, in response to the autonomous vehicle detecting a reckless driving vehicle such as a motorcycle approaching the vehicle too closely for safe automated driving, the vehicle may initiate the return control to user protocol. In this example, the protocol may require the driver to first look at the right CMS display 240. The eye and face tracking sensor 210 may register if the driver complies and is aware of the danger. Subsequently, the driver may be directed to view the speedometer of the IC display 230 to learn the speed and assess the possibility to brake or swerve. Next, the driver may be directed to look at the left CMS display 220 to determine whether it is possible to move left and avoid the dangerous condition previously detected at the right of the vehicle.

Example 3—Incorrect Behavior Prediction of Other Travel Participants

Figure 11:
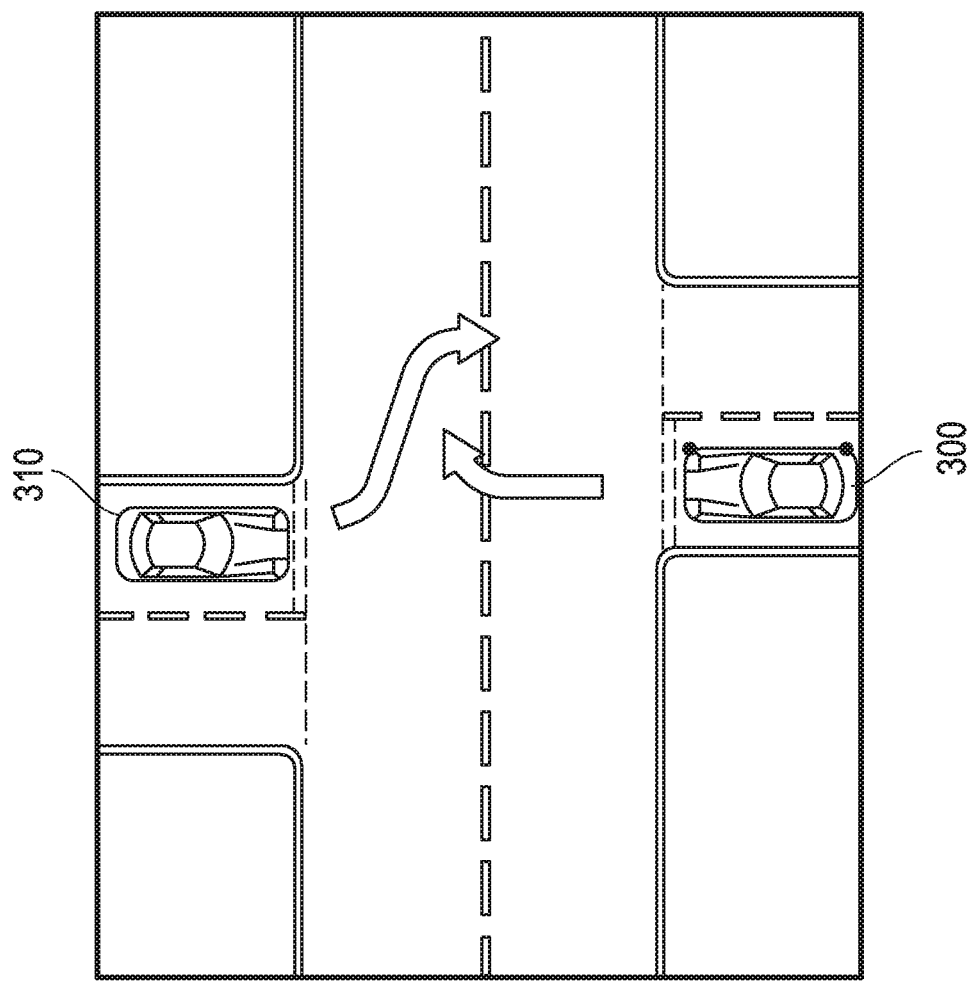
FIG. 11 is a diagram illustrating an additional example of a situation which may occur and be detected prior to an autonomous vehicle initiating the return control to user protocol.

FIG. 11 is a diagram illustrating an additional example of a situation which may occur and be detected prior to an autonomous vehicle initiating the return control to user protocol.

Referring to FIG. 11 and FIG. 8 together, in response to the autonomous vehicle 300 detecting a strange or unexpected maneuver from another vehicle 310, the autonomous vehicle may initiate the return control to user protocol. In this example, it is most important for the driver to check his own speed first and to estimate the distance to the oncoming car. Accordingly, the driver may be direct to first view the speedometer of the IC display 230 and then view the left/right CMS display 220, 240 in order to receive the information to make a decision on how to respond. For example, the driver may determine that the it safer to brake or swerve to avoid the potential collision. The eye and face tracking sensor 210 may monitor the proper sequence to determine if the driver is in control of the situation.

Example 4—Software Malfunction

Figure 12:
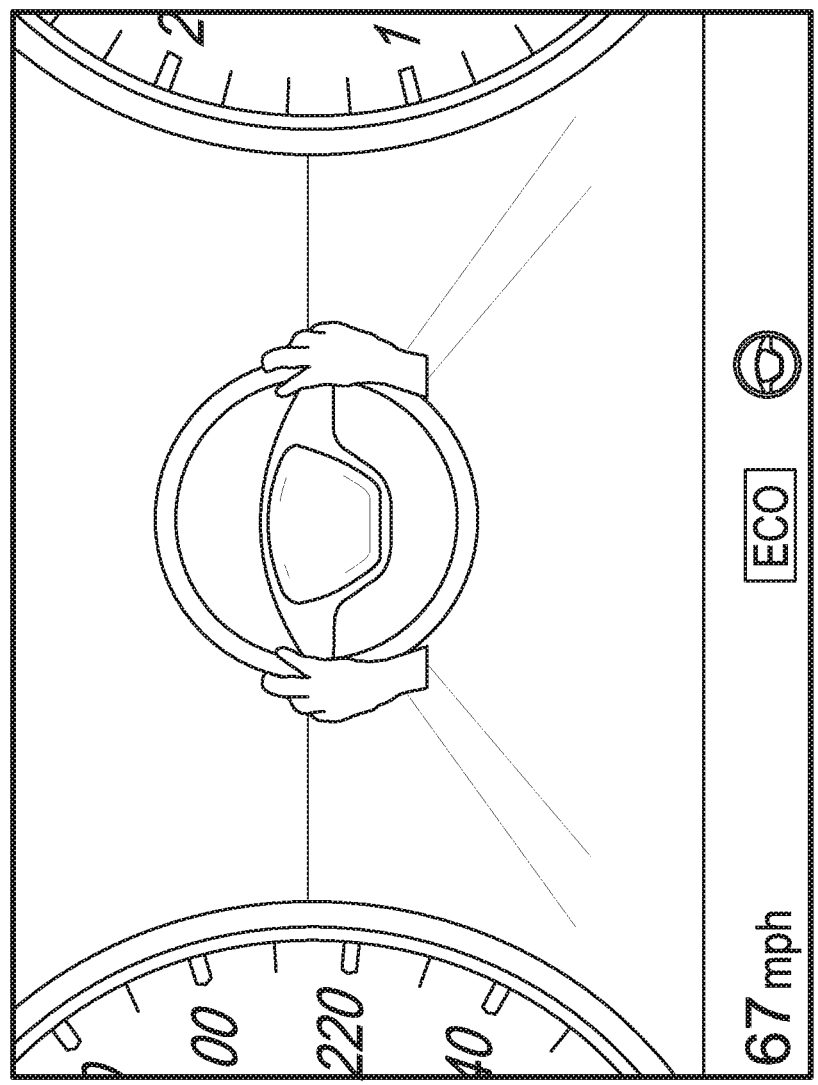
FIG. 12 is a diagram illustrating a further example of a situation which may occur and be detected prior to an autonomous vehicle initiating the return control to user protocol.

FIG. 12 is a diagram illustrating a further example of a situation which may occur and be detected prior to an autonomous vehicle initiating the return control to user protocol.

Referring to FIG. 12 and FIG. 8 together, in response to the vehicle reporting or detecting a problem with the software or sensors which would require control by the user, the return control to user protocol may be initiated. In this example, the driver is first directed to view the IC display 230 to check the speed and nature of the problem. For example, whether the problem is a software problem, a sensor problem, or any other vehicle problem. Next, the user may be directed to look through all displays and mirrors and the front windshield. In some examples, no specific sequence is required to be followed by the driver after viewing the IC display 230 because the nature of the problem is not related to external traffic conditions but internal software conditions. Thus, the driver likely has reasonable time and there is no immediate threat posed. The eye and face tracking sensor 210 may ensure that all required units have been checked and the driver is in control of the situation.

Example 5—Obstacles in Driving Path

Figure 13:
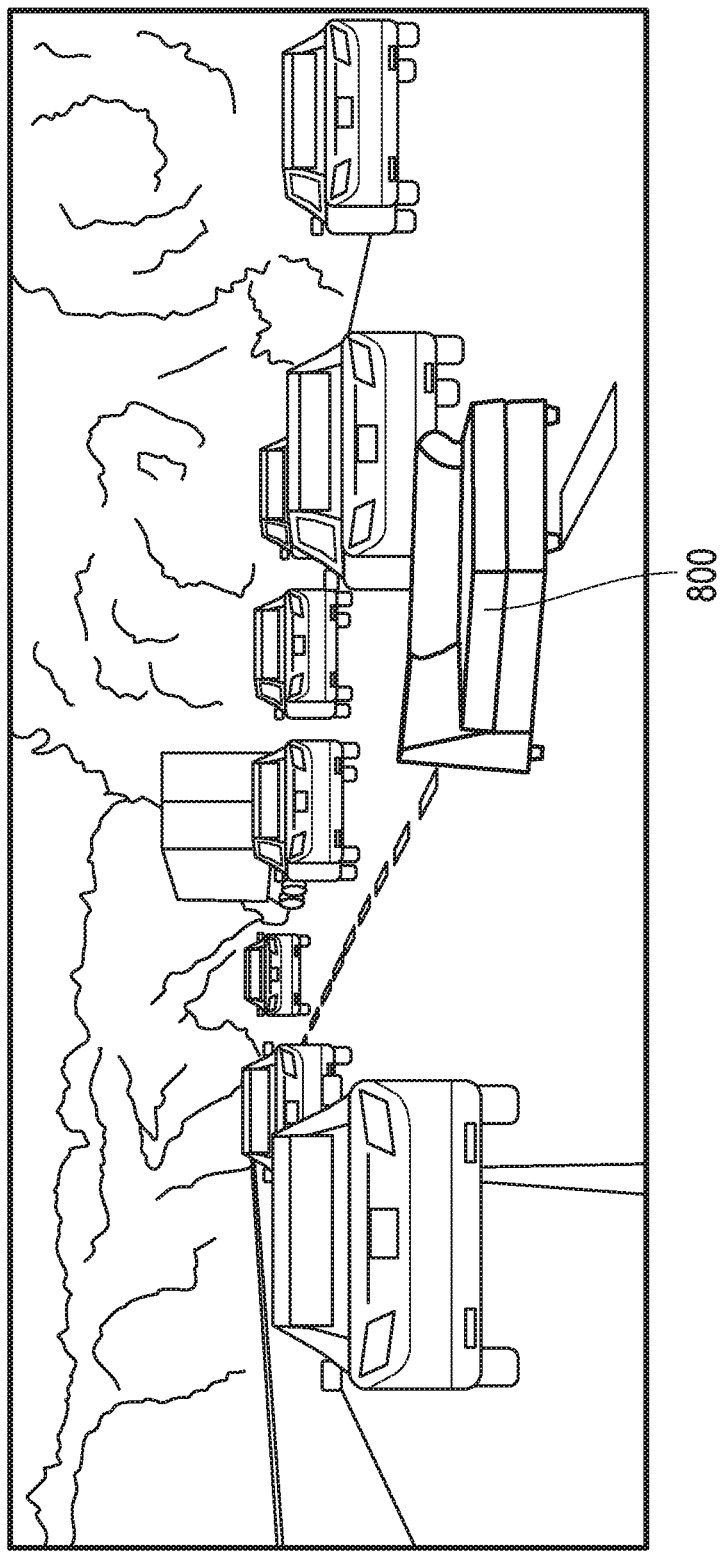
FIG. 13 is a diagram illustrating yet another example of a situation which may occur and be detected prior to an autonomous vehicle initiating the return control to user protocol.

FIG. 13 is a diagram illustrating yet another example of a situation which may occur and be detected prior to an autonomous vehicle initiating the return control to user protocol.

Referring to FIG. 13 and FIG. 8 together, in response to the autonomous vehicle sensors detecting unexpected obstacles or dangers on the road which may be better handled by the driver, the return control to user protocol may be initiated. While such scenarios may be reduced by car2x communication, a sensor may not be able to detect the actual level of danger and there may be need to return control to the user.

In this example, it is most important for the driver to see the obstacle and determine its nature. Thus, the user may be directed to view the HUD 250, and the HUD 250 may point to the obstacle and display the measured distance to the obstacle. Next, the user may be directed to view the IC display 230 to determine a speed of the vehicle. In some examples, the speed of the vehicle and level of danger may separately also be displayed on the HUD 250 in response to detecting an obstacle making easier for the user to gather all necessary information. This will support the user in deciding whether breaking, slowing down, or swerving may be the best response to the oncoming obstacles. Subsequently, the user may be guided to view the left/right CMS displays 220, 240 to determine the possibility of avoiding the object. The eye and face tracking sensor 210 may ensure that all required units have been checked and the driver is in control of the situation.

Example 6—Illumination Using Detected User Intention

In another example, any lighting module such as the LED module in the headlamp, as described in FIG. 1, the lighting module 5 of the rearview device 3, as described in FIG. 4, or any other vehicle lighting module as described throughout this application, may be controlled using the ECU 110 of an autonomous vehicle as described. Furthermore, any given light functionality (such as turn signal blinker, adaptive cornering light, daytime running light (DRL), side marker light, reverse gear indication, or security ground light), may be dependent on a detected user intention. For example, the eye and face tracking sensor 210 may follow and detect the gaze of a user or the position of a user. An expression of the user may also be registered by the eye and face tracking sensor 210. Using the detected information among other information, a user's intention may be tracked. According to the tracked user's intention, the ECU 110 may control one or more lighting modules. The tracked user intention may also be used in combination with other input data such as, for example, vehicle speed, steering wheel angle, and environmental data, such as road characteristics, illumination levels, weather, etc, as described above.

In one example, a user's intent to turn the vehicle is detected using the eye and face tracking sensor 210 and, in response, the light modules which light one or more light sectors in the path of the intended turn may be activated or made brighter. The adaptive cornering light may be activated in response to the predicted intention of the user to turn. In this example, the adaptive cornering light may be activated in response to the user's face turning beyond a certain degree. A number of other examples of controlling the brightness, color, or other functionalities of lighting modules (such as turn signal blinker, daytime running light (DRL), side marker light, reverse gear indication, or security ground light), as described in reference with FIGS. 1-6, are possible based on the detected user intention of an autonomous vehicle.

Example 7—Illumination in Response to User Retaking Control

In another example, any lighting module such as the LED module in the headlamp, as described in FIG. 1, the lighting module 5 of the rearview device 3, as described in FIG. 4, or any other vehicle lighting module as described throughout this application, may be controlled in response to the autonomous vehicle detecting that the user has retaken control of the vehicle. Similarly, any given light functionality (such as turn signal blinker, adaptive cornering light, daytime running light (DRL), side marker light, reverse gear indication, or security ground light), may be dependent on detecting that the user has retaken control of the autonomous vehicle. After the user retakes control and this is detected by the vehicle, an activation, brightness, or color of one or more light modules of the vehicle may be adjusted in response. The detection of the user retaking control of the vehicle may be achieved by the ECU 110 in accordance with the examples described above, and may follow one or more of the described protocols. In an example, detecting that the user has retaken control may activate or adjust a light on the lighting module 5 which is specific for indicating that the vehicle is being controlled autonomously or manually. A number of other examples of controlling the brightness, color, or other aspects of lighting modules, as described in reference with FIGS. 1-6, is possible in response to detecting that the user has retaken control of the autonomous vehicle.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

What is claimed is:

1. An exterior rearview system for an autonomous vehicle, comprising:
   a housing adapted for mounting to an exterior side of the autonomous vehicle, the housing holding at least one of a camera unit, a reflective element, or a display screen for displaying to a driver a rear or side image of the vehicle;
   one or more lighting modules disposed in the housing and comprising an adaptive lighting sector which is adaptively controlled; and
   a control system configured to receive input data related to at least one of a user's intention using a tracking sensor and a user's retaking control of the autonomous vehicle and to control the one or more lighting modules based on the received input data.

2. The exterior rearview system of claim 1, wherein the one or more lighting modules further comprises a lighting sector for implementing a turn-signal indicator.

3. The exterior rearview system of claim 1, wherein the one or more lighting modules comprises a plurality of LEDs for providing different lighting functions.

4. The exterior rearview system of claim 1, wherein at least one lighting module contains a single light source and a light guide for directing light from the light source to one or more output points.

5. The exterior rearview system of claim 1, further comprising light guides or optical fibers such that an illumination of a light source within the lighting module is directed via the light guides or optical fibers to multiple locations.

6. The exterior rearview system of claim 1, wherein the adaptive lighting sector is selected from an adaptive cornering light, an adaptive security light, and an adaptive interior light.

7. The exterior rearview system of claim 1, wherein the adaptive lighting sector is an adaptive security light configured to display a message or an alert.

8. The exterior rearview system of claim 7, wherein the message configured to be displayed is an information on whether the vehicle is in an autonomous mode or controlled by a driver.

9. The exterior rearview system of claim 1, wherein the control system controls at least one of a color, a shape, an intensity, and a timing of lights activated for the adaptive lighting sector.

10. The exterior rearview system of claim 1, wherein the control system is configured to activate the turn signal blinker light in addition to the adaptive lighting sector.

11. The exterior rearview system of claim 1, wherein the adaptive lighting sector is an adaptive cornering light, and the control system is configured to activate or deactivate the adaptive cornering light in response to an angle that a user's head is turned as detected by the tracking sensor.

12. The exterior rearview system of claim 1, wherein the adaptive lighting sector is at least one of an adaptive cornering light, a daytime running light (DRL), a side marker light, a reverse gear indication, or a security ground light, and the control system is configured to activate or deactivate the adaptive cornering light in response to the determined user intention.

13. The exterior rearview system of claim 1, wherein the adaptive lighting sector is at least one of an adaptive cornering light, a daytime running light (DRL), a side marker light, a reverse gear indication, or a security ground light, and the control system is configured to activate or deactivate the adaptive light sector in response to the user's retaking control of the autonomous vehicle.

14. An autonomous vehicle, comprising:
the exterior rearview system of claim 1;
an eye or face tracking sensor for tracking a user's movements or expressions;
at least one of a display for displaying information to the user and a speaker or an acoustic generating device for providing acoustic information; and
a control unit configured to communicate with the eye or face tracking sensor to detect a user's awareness and transfer control of the vehicle to the user using the detected awareness.

15. The autonomous vehicle of claim 14, wherein, in response to receiving a request to turn over driving controls to the user, the control unit is configured to activate an indicator requiring the user to look towards a predetermined position.

16. The autonomous vehicle of claim 14, wherein the predetermined position is a position on at least one of the display and a rear view system.

17. The autonomous vehicle of claim 14, wherein the eye or face tracking sensor tracks the user's movement or position to confirm that the user is looking towards the predetermined position.

18. The autonomous vehicle of claim 14, wherein the eye or face tracking sensor tracks a change in the user's expression to confirm that the user is aware of a surrounding circumstance.

19. The autonomous vehicle of claim 14, wherein in response to detecting a bad weather condition, the control unit is configured to activate an indicator requiring the user to look first towards the display and then towards a rear view system.

20. The autonomous vehicle of claim 14, wherein in response to detecting an unexpected or unpredicted maneuver from another vehicle, the control unit is configured to activate an indicator requiring the user to look first towards the display and then towards a rear view system.

21. The autonomous vehicle of claim 14,
wherein the display comprises a head up display and an instrument cluster, and
in response to detecting a software malfunction, the control unit is configured to activate an indicator requiring the user to look first towards the instrument cluster and then towards a rear view system and the head up display in no specific order.

22. The autonomous vehicle of claim 14,
wherein the display comprises a head up display and an instrument cluster, and
in response to detecting an obstacle in a driving path, the control unit is configured to activate an indicator requiring the user to look first towards the head up display and then towards the instrument cluster and then towards a rear view system.

23. The autonomous vehicle of claim 14, wherein the display is configured to be inside or outside the vehicle, and provided by a head-up display, a dashboard, an interior rearview device, a ceiling of the vehicle, a door inside the vehicle, or on a surface inside the vehicle.

* * * * *